(12) United States Patent
Liu

(10) Patent No.: US 10,516,509 B2
(45) Date of Patent: Dec. 24, 2019

(54) METHODS AND DEVICES FOR UPDATING AN UPLINK CONTENTION WINDOW SIZE IN A WIRELESS COMMUNICATION SYSTEM

(71) Applicant: JRD COMMUNICATION INC., Shenzhen, Guangdong (CN)

(72) Inventor: Guang Liu, Guangdong (CN)

(73) Assignee: JRD COMMUNICATION INC., Shenzhen, Guangdong (CN)

(*) Notice: Subject to any disclaimer, the term of this patent is extended or adjusted under 35 U.S.C. 154(b) by 0 days.

(21) Appl. No.: 16/082,534

(22) PCT Filed: May 27, 2017

(86) PCT No.: PCT/CN2017/086332
§ 371 (c)(1),
(2) Date: Sep. 5, 2018

(87) PCT Pub. No.: WO2018/024022
PCT Pub. Date: Feb. 8, 2018

(65) Prior Publication Data
US 2019/0149270 A1 May 16, 2019

(30) Foreign Application Priority Data

Aug. 5, 2016 (GB) .................................. 1613512.1

(51) Int. Cl.
*H04W 4/00* (2018.01)
*H04L 1/18* (2006.01)
(Continued)

(52) U.S. Cl.
CPC ............ *H04L 1/187* (2013.01); *H04L 1/1812* (2013.01); *H04L 1/1854* (2013.01);
(Continued)

(58) Field of Classification Search
CPC ..... H04L 1/187; H04L 1/1812; H04L 1/1854; H04L 12/4035; H04L 12/413; H04W 72/0446; H04W 74/0816
(Continued)

(56) References Cited

U.S. PATENT DOCUMENTS

2014/0112153 A1 4/2014 Jin et al.
2018/0027554 A1* 1/2018 Yerramalli ............ H04L 1/1825
370/329
(Continued)

FOREIGN PATENT DOCUMENTS

CN 105338651 A 2/2016

OTHER PUBLICATIONS

Huawei, HiSilicon, "Contention window size adjustment for UL category 4 LBT for eLAA", 3GPP TSG RAN WG1 Meeting #85, R1-164073, May 27, 2016.
(Continued)

*Primary Examiner* — Thai D Hoang
(74) *Attorney, Agent, or Firm* — Baker & Hostetler LLP

(57) ABSTRACT

Updating an uplink contention window size in a listen before talk process in a wireless communication system such as LTE may be done by the eNB if transport blocks contained in the starting subframe of a reference scheduled burst transmitted by a User Equipment are successfully decoded at the eNB. Otherwise, the User equipment adjusts the contention window size depending on information supplied by the eNB. This information identifies the first subframe in the burst whose transport block the base station was able to successfully decode. Depending on whether the User Equipment was first transmitting before or on the identified subframe, the User Equipment can either increase or reset the contention window size.

23 Claims, 3 Drawing Sheets

(51) Int. Cl.
*H04L 12/413* (2006.01)
*H04W 74/08* (2009.01)
*H04L 12/403* (2006.01)
*H04W 72/04* (2009.01)
*H04W 72/14* (2009.01)

(52) U.S. Cl.
CPC ........ *H04L 12/4035* (2013.01); *H04L 12/413* (2013.01); *H04W 72/0446* (2013.01); *H04W 74/0816* (2013.01); *H04W 72/14* (2013.01)

(58) Field of Classification Search
USPC ................ 370/329–330, 335–345, 276–295, 370/352–356
See application file for complete search history.

(56) References Cited

U.S. PATENT DOCUMENTS

| | | | |
|---|---|---|---|
| 2018/0027582 A1* | 1/2018 | Yerramalli | H04L 1/1825 370/336 |
| 2019/0246412 A1* | 8/2019 | Noh | H04L 5/00 |

OTHER PUBLICATIONS

Ericsson [Huawei, HiSilicon], "WF on CW adjustment for UL LBT based on Cat. 4", 3GPP Draft; R1-165713, 3rd Generation Partnership Project (3GPP), vol. RAN WG1, No. Nanjing, China, May 23, 2016-May 27, 2016, May 30, 2016.
Erigsson, "On UL Channel Access Procedures", 3GPP Draft; R1-165157, 3rd Generation Partnership Project (3GPP), vol. RAN WG1, No. Nanjing, China; May 23, 2016-May 27, 2016, May 14, 2016.

* cited by examiner

METHODS AND DEVICES FOR UPDATING AN UPLINK CONTENTION WINDOW SIZE IN A WIRELESS COMMUNICATION SYSTEM

CROSS-REFERENCE TO RELATED APPLICATIONS

This application is a National Stage of International patent application PCT/CN2017/086332, filed on May 27, 2017, which claims priority to Great Britain Patent Application No. GB 1613512.1, filed on Aug. 5, 2016, the disclosures of which are incorporated by reference in their entirety.

TECHNICAL FIELD

Embodiments of the present invention generally relate to wireless communication systems and in particular to devices and methods for updating an Uplink contention window size associated with a Listen Before Talk (LBT) procedure which may be used to access an unlicensed communications channel. The invention has particular application, though is not limited to, enhanced Licensed Assisted Access (eLAA) technologies in an LTE (Long Term Evolution) advanced wireless communication system.

BACKGROUND

Wireless communication systems, such as the third-generation (3G) of mobile telephone standards and technology are well known. Such 3G standards and technology have been developed by the Third Generation Partnership Project (3GPP). The $3^{rd}$ generation of wireless communications has generally been developed to support macro-cell mobile phone communications. Such macro cells utilise high power base stations (NodeBs) to communicate with wireless communication devices within a relatively large geographical coverage area. Typically, wireless communication devices, or User Equipment (UEs) as they are often referred to, communicate with a Core Network (CN) of the 3G wireless communication system via a Radio Network Subsystem (RNS). A wireless communication system typically comprises a plurality of radio network subsystems, each radio network subsystem comprising one or more cells to which UEs may attach, and thereby connect to the network. Each macro-cellular RNS further comprises a controller, in a form of a Radio Network Controller (RNC), operably coupled to the one or more NodeBs. Communication systems and networks have developed towards a broadband and mobile system. The 3rd Generation Partnership Project has developed the so-called Long Term Evolution (LTE) and LTE advanced solutions, namely, an Evolved Universal Mobile Telecommunication System Territorial Radio Access Network, (E-UTRAN), for a mobile access network, and a System Architecture Evolution (SAE) solution, namely, an Evolved Packet Core (EPC), for a mobile core network. A macrocell in an LTE system is supported by a base station known as an eNodeB or eNB (evolved NodeB).

Current wireless communications networks operate using licensed radio spectrum in which multiple accesses to the communications resources of the licensed radio spectrum is strictly controlled. Each user of the network is essentially provided a "slice" of the spectrum using a variety of multiple access techniques such as, by way of example only but not limited to, frequency division multiplexing, time division multiplexing, code division multiplexing, and space division multiplexing or a combination of one or more of these techniques. Even with a combination of these techniques, with the popularity of mobile telecommunications, the capacity of current and future networks is still very limited, especially when using licensed radio spectrum.

The use of unlicensed radio spectrum may also be used by network operators in order to increase or supplement capacity. For example, a network based on the Long Term Evolution (LTE)/LTE advanced standards has an enhanced downlink that uses a Licensed-Assisted-Access (LAA) procedure to operate on unlicensed spectrum. All communication devices need to complete a LBT (Listen Before Talk) procedure before accessing an unlicensed channel and it has been agreed to classify LBT schemes into 4 categories. In particular, Category 4 specifies LBT with random back-off with variable size of contention window. A device monitors a channel to decide if it is clear or busy. To make this decision, a device needs to keep listening to the channel for a "backoff" period. During this "back-off period, a timer is decremented. If the channel becomes busy (e.g. energy is detected over a predefined threshold) then the timer is frozen until the channel is no longer busy whereupon the timer continues decrementing. When the back-off timer expires then the device can transmit. During the timer running period, a number of channel clearance assessments (CCA) are performed. This number is randomly drawn from a "contention window" (CW). The CW is initially assigned a minimum size CWmin which is then adjusted based on collision detection. CW size is increased by a predefined step when collision is detected (i.e. an unsuccessful transmission) until a maximum value CWmax is reached, or reset to a minimum value CWmin when collision is not detected (i.e. a successful transmission).

Currently, for LAA in LTE, DL (downlink) and UL (uplink) are implemented in different ways, and an eNB can start a DL transmission any time on any channel while UEs can only start an UL transmission on specific subframes of specific channels allocated by the eNB with UL Grant messages.

For downlink LBT, four different priorities have been defined each having different CWmin and CWmax values and different CW steps (amongst other parameters). A priority is selected according to the traffic type to be sent. For example, an instant message requires a short latency and so a priority with a small contention window can be selected so that the uplink transmission can start after a short LBT procedure.

Methods for updating downlink CW and uplink CW are known and certain techniques are described in 3GPP TS 36.213 V13. For example, in the downlink an eNB may send a number of transport blocks (TBs) to several UEs in a reference subframe. Subsequently all UEs indicate an Ack/Nack in the uplink control signalling (using a licensed channel) depending on whether the received TBs were decoded successfully or not. If 80% or more transport blocks are indicated as Nack, then the eNB increases its CW size by one step, otherwise the CW is reset to the permitted minimum value CWmin. In the uplink, a CW size may be managed by the eNB and indicated to a UE in the uplink grant message. For example, for Category 4 LBT and for PUSCH (Physical Uplink Shared Channel) transmission on an LAA SCell, a CW size may be adjusted per UE based on whether or not a reference subframe in an uplink transmission burst transmitted by the UE is successfully decoded at the eNB. In particular, if at least one transport block in the reference subframe is successfully decoded at the eNB, then the CW size is reset for all priority classes. Otherwise, it is increased to the next higher value for all the priority classes. Some methods rely on decisions being made in the UE.

Known techniques do have certain drawbacks however. For example, a false alarm can occur when a UE is not transmitting in the reference subframe due to LBT failure but another device (for example, a Wi-Fi access point) is transmitting on the channel in question. In such a case the eNB may believe that it has received an incorrect uplink transmission from the UE and as a result, indicate to the UE to increase the CW size (unnecessarily). This action will, disadvantageously, reduce the uplink throughput. A missed detection can occur when the UE did transmit a reference subframe but the eNB failed to detect it due to collision with transmissions from another device. With a missed detection, the CW size will not be increased accordingly (although it should be). This problem of missed detection has the further disadvantage of permitting contiguous interference with Wi-Fi signals whenever collisions keep happening without being detected. Some known methods rely on decisions being made at the UE such that the eNB does not know the exact value of the current CW size. This can lead to inefficient scheduling at the eNB. Some known methods ensure alignment of the CW size between the eNB and the UEs. However, a mismatch may still occur whenever an uplink grant message is lost.

It would be advantageous to provide a means for updating an uplink contention window size which mitigated at least some of the disadvantages of known systems and methods.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a wireless communication device including a signal processing circuit for generating a reference scheduled burst comprising a starting subframe followed by a sequence of subsequent subframes, at least one subframe containing at least one transport block, and for adjusting an uplink contention window value based on information received from a base station, and a receiver for receiving the information from the base station wherein the wireless communication device is arranged to mark down a reference HARQ process ID which was sent in the starting subframe of a most recent reference scheduled burst after a Listen Before Talk procedure and excluding those HARQ process IDs within a required processing time of the subframe when the next uplink grant message is received from the base station.

The required processing time may be 3 ms.

The toggled NDI (New Data Indicator) of a HARQ process ID in the uplink grant message may be used to reset the uplink contention window size for all priority classes.

The non toggled NDI (New Data Indicator) of a HARQ process ID in the uplink grant message may be used to increase the uplink contention window size for all priority classes to the next higher level.

There is also provided a method for updating an uplink contention window size in a listen before talk process in a wireless communication system, the method comprising; at a wireless communication device, transmitting a reference scheduled burst comprising a starting subframe followed by a sequence of subsequent subframes, at least one subframe containing at least one transport block; and at a base station, receiving the reference scheduled burst from the wireless communication device, detecting at least one subframe of the reference scheduled burst, decoding a transport block contained in at least one subframe in the reference scheduled burst, and if a transmission block contained in the starting subframe is successfully decoded, instructing the wireless communication device to reset the uplink contention window size to a predetermined minimum value CWmin otherwise, indicating to the wireless communication device, a first subframe whose at least one transport block contained therein was successfully decoded, and at the wireless communication device, receiving the indication and adjusting the uplink contention value size based on the indication.

The wireless communication system may be an LTE system and the wireless communication device may comprise a user equipment (UE) or similar mobile communications device and the base station may comprise an eNB.

In one embodiment, the starting subframe may be considered as a first scheduled subframe and may be the starting subframe of the most recent uplink transmission burst for which a Category 4 listen before talk procedure was expected (by the base station) to be used and for which DMRS (Demodulation Reference Signal) or SRS (Sounding Reference Signal) transmission from the wireless communication device is detected and at least one transport block is successfully decoded.

The reference scheduled burst may be the most recent set of contiguous (i.e without any gap in between) scheduled uplink subframes for a wireless communication device that is expected to start after a Category 4 listen before talk procedure and at least one subframe is expected to end four subframes earlier than the subframe in which the following contention window size adjustment is transmitted (from the base station to the wireless communication device). In general, a burst may include some subframes which are four subframes earlier than the UL Grant transmission and some subframes which are within three subframes before the UL Grant transmission. However, only the subframes which are four subframes earlier (inclusive) are used to adjust a contention window size.

In the case where at least one transport block is contained in the starting subframe and is successfully decoded, the base station may instruct the wireless communication device to reset the contention window size for all priority classes to the minimum value. Further, as this is situation signifies a no collision situation, the contention window size can be reset at both the base station and the wireless communication device.

There may be an instance where the base station detects a subframe (other than the starting subframe) and this is the first subframe that it has detected but no transport block in this first detected subframe is successfully decoded (due to a collision). In such a case, the base station may instruct the wireless communication device to increase the uplink contention window size for all priority classes (the increase may be one step), and increase its own contention window size by one step.

The base station may indicate to the wireless communication device an index of a particular subframe if the particular subframe is the first subframe of the transmission burst to be detected and is also the first subframe with at least one transport block having been successfully decoded, but not being the starting subframe.

In cases where a transport block in the first detected subframe is successfully decoded but that detected subframe is not the starting subframe, the base station, in such a situation, is unable to determine if a collision has happened or not in any subframe from the starting subframe to the detected subframe and so lets the wireless communication device determine an appropriate contention window size and merely indicates to the wireless communication device the detected subframe's location by means of an indicator (such as the subframe index) In some embodiments, if the wireless communication device did actually transmit before the detected subframe, then the wireless communication device may increase the uplink contention window sizes for all priority classes by one step. Otherwise, it can reset the contention window size (to CWmin).

An indication of an adjustment to the uplink contention window size may be made by the base station to the wireless communication device by including it in an uplink grant message.

In one embodiment, the uplink contention window size is reset to the minimum value CWmin if the maximum contention window size CWmax has been used for K consecutive LBT attempts for transmission only for the priority class for which maximum contention window sizes were used for K consecutive LBT attempts. (K may be selected by base station implementation from the set of values from 1, 2 . . . 8).

If the wireless communication device first transmitted after a Category 4 LBT in a reference scheduled burst earlier than the particular subframe whose index is indicated to the wireless communication device, the contention window sizes for all priority classes may be increased. A transmission may comprise data, transport blocks or signalling, for example.

If the wireless communication device first transmitted in the indicated particular subframe, then the contention window sizes for all priority classes may be reset.

If no subframe was detected by the base station, then this fact may be indicated by the base station to the wireless communication device.

If the first detected subframe occurs before the first subframe containing at least one successfully decoded transmission block, (i.e. no TBs were successfully decoded in the first detected subframe), the base station can infer that a collision happened in that first detected subframe and subsequently can increase the uplink contention window size by one step at both base station and wireless communication device sides.

Advantageously, the chances of a false alarm are greatly reduced compared with the known techniques because false alarms can be controlled by adjusting the detection threshold. In the present invention, the detection threshold is high enough for the number of false alarms to be negligible. Further there are likely to be fewer instances when the base station does not know the exact value of the current uplink contention window size being used by the wireless communication device.

Each time a transmission block is decoded in the starting subframe or a subframe is detected but no transport block is decoded, this helps to align the uplink contention window size between a base station and a wireless communication device.

There is also provided a base station including a receiver for receiving from a wireless communication device a reference scheduled burst comprising a starting subframe followed by a sequence of subsequent subframes, at least one subframe containing at least one transport block, a signal processor for; detecting at least one subframe of the reference scheduled burst and decoding a transport block contained in at least one subframe in the reference scheduled burst, and a transmitter for sending an instruction to the wireless communication device to reset an uplink contention window size to a predetermined minimum value if a transmission block contained in the starting subframe is successfully decoded, and for indicating to the wireless communication device a first subframe in the reference scheduled burst whose at least one transport block contained therein was successfully decoded if at least one transport block in the starting subframe was not successfully decoded.

There is also provided a wireless communication device including a signal processing circuit for generating a reference scheduled burst comprising a starting subframe followed by a sequence of subsequent subframes, at least one subframe containing at least one transport block, and for adjusting an uplink contention window value based on information received from a base station, and a transmitter for transmitting to the base station the generated reference scheduled burst, and a receiver for receiving the information from the base station, said information indicating a first subframe in the reference scheduled burst other than the starting subframe whose at least one transport block contained therein was successfully decoded at the base station.

In one embodiment, the base station and wireless communication device are arranged to support a Listen Before Talk (LBT) procedure. In one particular embodiment, the wireless communication system is an LTE advanced system in which Licensed Assisted Access is supported and which uses a Category 4 Listen Before Talk procedure.

The base station may be an eNB and the wireless communication device may be a user equipment (UE) or other mobile device.

In some embodiments, a decision concerning whether to adjust an uplink contention window size may be made by the eNB. For example, when at least one TB (Transport Block) is received in a starting subframe (R1), a "CWS reset" (Contention Window Size) may be indicated from the eNB to the UE. When a first subframe (R2) is detected but not received, a "CWS value" may to be indicated from the eNB to the UE, instructing the UE to increase the uplink contention window size.

In other embodiments, a decision concerning whether to adjust an uplink contention window size may be made by the UE. For example, when a first subframe is received but all subframes before the first subframe are not detected (R2=R3), an index of the received subframe (R3) may be indicated to the UE by the eNB. When no subframe is detected, then this situation may be indicated to the UE by the eNB.

From the signalling point of view, for any indication that the eNB sends to the UE there are two options. A first option is an explicit indication and the second is an implicit indication (with HARQ (Hybrid Automatic Repeat Request) process ID). If the eNB needs to send an indication to the UE to reset the uplink contention window size, then the eNB may indicate a specific value, of four bits for example and include this in an uplink grant message or, alternatively, may include in the uplink grant message the HARQ process (P) scheduled in the starting subframe (R1) last time. If the eNB needs to send an indication to the UE to adjust the uplink contention window size to a specific value, then the eNB may include such specific value as a number of bits, for example or, alternatively may Include all HARQ process(es) scheduled from the starting subframe (R1) to the first subframe detected (R2) last time. It can be guaranteed that HARQ process 'P' used by the UE as a reference must be in the set of HARQ process(es) scheduled from R1 to R2 last time.

An Index of a received subframe (R3) may be explicitly indicated as a specific value as a number of bits in the uplink grant message. Alternatively the eNB may include in the uplink grant message all HARQ process(es) scheduled from R1 to R3 last time, it can be guaranteed that HARQ process P used by the UE as a reference must be in the set of HARQ process(es) scheduled from R1 to R3 last time.

If the eNB needs to indicate to the UE that no subframe has been detected, it may indicate a specific value as a number of bits or, alternatively may include all HARQ process(es) scheduled in the last uplink grant message excluding those within 3 ms of the current uplink grant message.

At the UE side, it marks down the reference HARQ process ID (P) which was sent in the first subframe of the most recent burst after a Category 4 LBT procedure and which is at least 4 ms earlier than the subframe when the next uplink grant message is received. If the eNB includes HARQ process ID (P) in the current uplink grant message, then the UE can use this implicit signalling to adjust the uplink contention window size. In particular, if NDI (New Data Indicator) is toggled (ACK), then the UE may reset the uplink contention window size for all priority classes. If, on the other hand, the NDI is not toggled (NACK), the UE may increase the contention window size for all priority classes to the next higher level.

However, if the HARQ process ID (P) is not included, then the UE may assume that the uplink grant message includes specific signalling instead and will set the uplink contention window size in accordance with the indicator. For example, the UE may use a "CWS reset or "CWS value" directly. The UE may check if its transmission matches with the indicated index of the received subframe (R3) and "no subframe is detected" or not. If the answer is yes then the UE may reset the uplink contention window size for all priority classes. If the answer is no then the UE may increase the uplink contention window size for all priority classes to the next level.

It will be appreciated that there may be a set of HARQ process(es) which can be used as a reference HARQ process. The UE can mark down reference HARQ processes as long as their corresponding transmit subframes are posterior to the last subframe based on which the last CWS adjustment was done. Any reference HARQ process can be used to update the CWS if it is scheduled in an uplink grant message. When more than one reference HARQ processes are scheduled, the most latest one is used to update the CWS. The UE will unmark reference HARQ processes whose transmit subframes are anterior to the transmit subframe from where the HARQ process, used for CWS adjustment, is received.

When the CW sizes for specific priority classes are already on the maximum, both the eNB and the UE may keep the CW sizes unchanged. Further, if it has not been changed at the maximum value for K times, it can be automatically reset to the minimum value.

There is also provided a non-transitory computer readable medium having computer readable instructions stored thereon for execution by a processor to perform the method according to the disclosure above.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION OF THE PREFERRED EMBODIMENTS

Those skilled in the art will recognise and appreciate that the specifics of the examples described are merely illustrative of some embodiments and that the teachings set forth herein are applicable in a variety of alternative settings.

Figure 1:
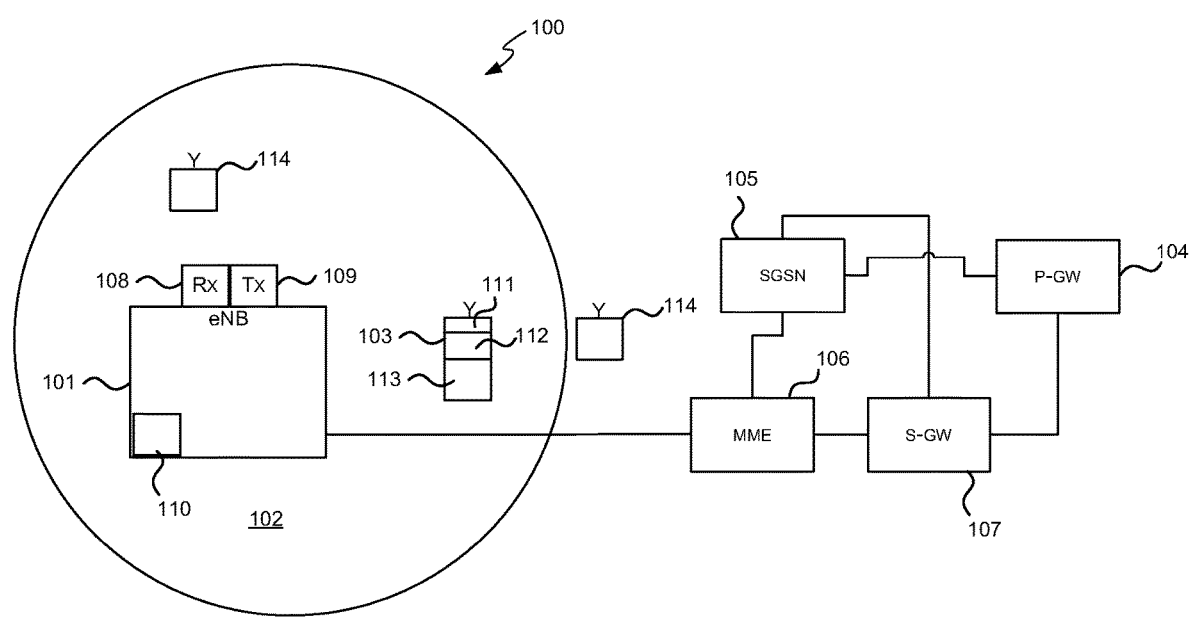
FIG. 1 is a simplified block diagram of a part of a wireless communication system and operating in accordance with an example embodiment.

Referring now to FIG. 1, an example of part of an LTE cellular communication system operating in accordance with embodiments of the invention is illustrated and indicated generally at 100 and comprises an evolved Node B (eNB) 101 supporting an LTE cell 102. In other embodiments, the eNB 101 may support a multiplicity of cells. The cell 102 can be considered to be a cell using licensed frequency spectrum or can be a LAA cell using unlicensed spectrum. The eNB 101 and UE 103 have the capability of operating a Listen Before Talk procedure. The evolved Node B 101 comprises a part of a radio access network which in this example is an E-UTRAN. User Equipment 103 is located within the area of coverage of the cell 102. Just one User Equipment is shown in FIG. 1 but more User Equipments may be located in the cell 102 and be in a connected mode at any given time. An evolved packet core (EPC) of the Wireless Communications System of FIG. 1 includes a Packet Gateway P-GW 104 and a Serving GPRS (General Packet Radio System) Support Node (SGSN) 105. The P-GW 104 is responsible for interfacing the radio access network with a packet data network, e.g. a Packet Switched Data Network (PSDN) (such as the Internet). The SSGN 105 performs a routing and tunneling function for traffic to and from the cell 102, while the P-GW 104 links with external packet networks. The EPC also comprises a Mobility Management Entity 106. The eNB 101 is linked to the SSGN 105 through the Mobility Management Entity (MME) 106. The eNB 101 is also connected with the P-GW 104 through the MME 106 and a Service Gateway S-GW 107. The MME 106 handles signalling control and mobility while the S-GW 107 is a local anchor point for user data.

The eNB 101 is provided with a receiver circuit 108 for receiving transmissions from one or more UEs and also a transmitter circuit 109 for transmitting messages to one or more User Equipments. The eNB is also provided with a signal processor 110 whose purpose will be described below. The User Equipment 103 includes a receiver 111 for receiving messages from the eNB 101 a transmitter 112 for transmitting messages to the eNB 101 and a signal processing circuit 113 whose function will be described below. The eNB 101 supports communications with the UE 103 using licensed and unlicensed spectrum. An access point 114 provides WiFi signals using unlicensed spectrum for use by communications devices within their coverage areas.

In a first embodiment, the eNB 101 and UE 103 may wish to use unlicensed spectrum provided by the access point 114 but first need to ensure that it is not already in use by any other devices. This can be done using the LBT procedure as mentioned above. A contention window (CW) size is bounded by $CW_{min}$ and $CW_{max}$ and set an initial value for both downlink and uplink by the eNB 101. A random value is drawn within the contention window every time a LBT needs to be done and this random value is used to determine the number of CCAs (Channel Clearance Assessment) with in one LBT procedure.

The signal processing circuit 110 in the UE generates a reference scheduled burst which the UE 103 transmits over the unlicensed channel for reception by the eNB 101. In this example, the reference scheduled burst is a sequence of subframes comprising a starting subframe followed by a sequence of subsequent subframes. Each subframe contains at least one transport block. A maximum transmission burst length is typically 6 ms (i.e. 6 subframes). The reference scheduled burst is received by the eNB 101 and the signal processor 110 in the eNB attempts to detect each subframe and also attempts to decode at least one transport block that may be contained in any subframe. Detection and decoding may be affected if another device is also trying to use the same channel i.e. a collision occurs. The eNB 101 may generate an uplink grant message and send it to the UE 103. The uplink grant message may include an indication of an updated contention window size or may contain an index of a particular frame in the received reference scheduled burst. Any subframe which is used for a contention window size adjustment must be at least 3 ms earlier than the uplink grant transmission time. (A 3 ms gap is required as processing time). In this example a subframe is indexed from the subframe (X) where an UL grant message was received (at the UE 103), so 1 means subframe X−4, 2 means subframe X−5, and so on.

Detection based on DMRS (Demodulation Reference Signal) and SRS (Sounding Reference Signal) can be employed at the eNB 101. A detection threshold can set (by the eNB 101) so that the false alarm rate can be kept at a low level. Any missed detection will not cause a problem if the eNB 101 indicates to the UE 103 the first subframe (other than the starting subframe) in the reference scheduled burst whose transport blocks contained therein was successfully decoded. False alarm and missed detection is a tradeoff and in general, false alarm can be reduced by increasing the detection threshold which will increase the missed detection. However, since the above-described embodiment can compensate for a missed detection, it is possible for the eNB 101 to use a relatively high threshold to reduce the false alarm probability.

Figure 2:
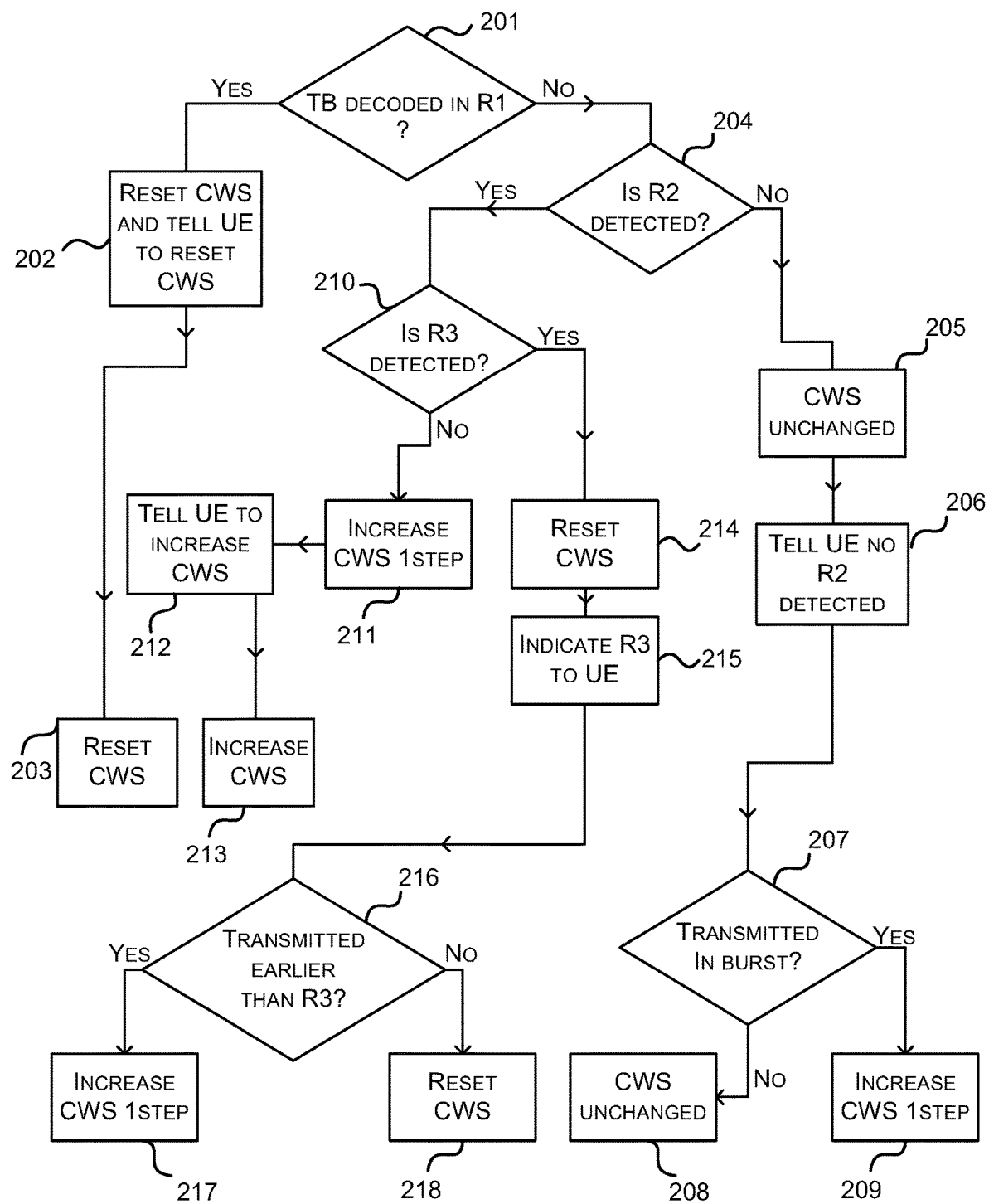
FIG. 2 is a simplified flow chart first illustrating a first exemplary method for updating an uplink contention window.

Reference will now be made to FIG. 2 which is a flow chart illustrating a first method for updating a contention window and which may be carried out in the wireless communication system of FIG. 1. Three reference subframes may be defined: reference subframe R1 is the first scheduled subframe (the starting subframe) of a reference scheduled burst scheduled by an eNB; reference subframe R2 is the first subframe in the reference scheduled burst that is detected by the eNB (in certain circumstances R2 and R1 may be the same subframe); reference subframe R3 is the first subframe in the reference scheduled burst whose at least one transport block contained therein is successfully decoded by the eNB. (In certain circumstances R1, R2 and R3 may be the same subframe and in other circumstances R2 and R3 may be the same subframe). R1, R2 and R3 are expected to be at least 4 subframes earlier than the subframe in which the following contention window size adjustment is transmitted from the eNB to the UE (in an uplink grant message for example). (Note that in some instances R2 and R3 may not actually exist).

At 201, the eNB attempts to detect the starting subframe, R1 and to decode at least one transport block (TB) contained therein. If this is done successfully, then at 202, the eNB resets the contention window sizes (CWS) for all priority classes of the UE at the eNB side to their minimum values and sends a message to the UE instructing it to reset its uplink contention window size (CWS) to the minimum value CWmin. Subsequently, in the UE at 203, the CWS is reset. If, on the other hand, no transport block was successfully decoded from R1, then at 204, the eNB attempts to detect another subframe, R2. If no subframe was detected i.e R2 does not exist, then the uplink contention window size at the eNB side remains unchanged, at 205, and at 206 the eNB informs the UE that no subframe was detected. If, (207), the UE had not actually transmitted any transport blocks in the burst then the uplink contention window size can remain unchanged at the UE side (208). However, if the UE had transmitted transport blocks in the burst and the eNB had failed to detect any subframes at all then the UE needs to increase its uplink contention window size and at 209 increases the CWS for all priority classes by one step.

Reverting to 204, if R2 is detected but, at 210, R3 is not, (i.e. no transport blocks are successfully decoded in R2) then at 211 the eNB increases the uplink CW sizes for all priority classes at the eNB side by one step and indicates to the UE a coded CW size value for the UE to increase its uplink contention window size for all priority classes, at 212. At 213 the UE makes the adjustment as indicated by the eNB. It will be appreciated that different priority classes have different numbers of CW sizes. For instance, priority 4 has 7 different CW sizes while Priority 3 has 3 different CW sizes. 3 bits can be indicated for maximum 7 CW sizes. For example, 000 means CWmin, 110 means CWmax. So for priority 4, the UE can directly use the indicated value to set the CW size.

Reverting to 210 if at least one transport block is successfully decoded in R2 (i.e R3 exists and R2=R3) then at 214 the eNB resets the CW the eNB side and indicates R3 to the UE (by way of the index as defined above) at 215. If, (at 216) the UE had transmitted earlier than R3, then at 217 the UE increases the CWS by one step. If on the other hand, the UE had not transmitted earlier than R3 then it can reset the CWS at 218.

In one example, the signalling used to convey the information sent from the eNB to the UE and steps 202, 206, 212 and 215 may comprise four bits. A bit may be used to indicate whether the information relates to a CW size or an index of subframe.

Figure 3:
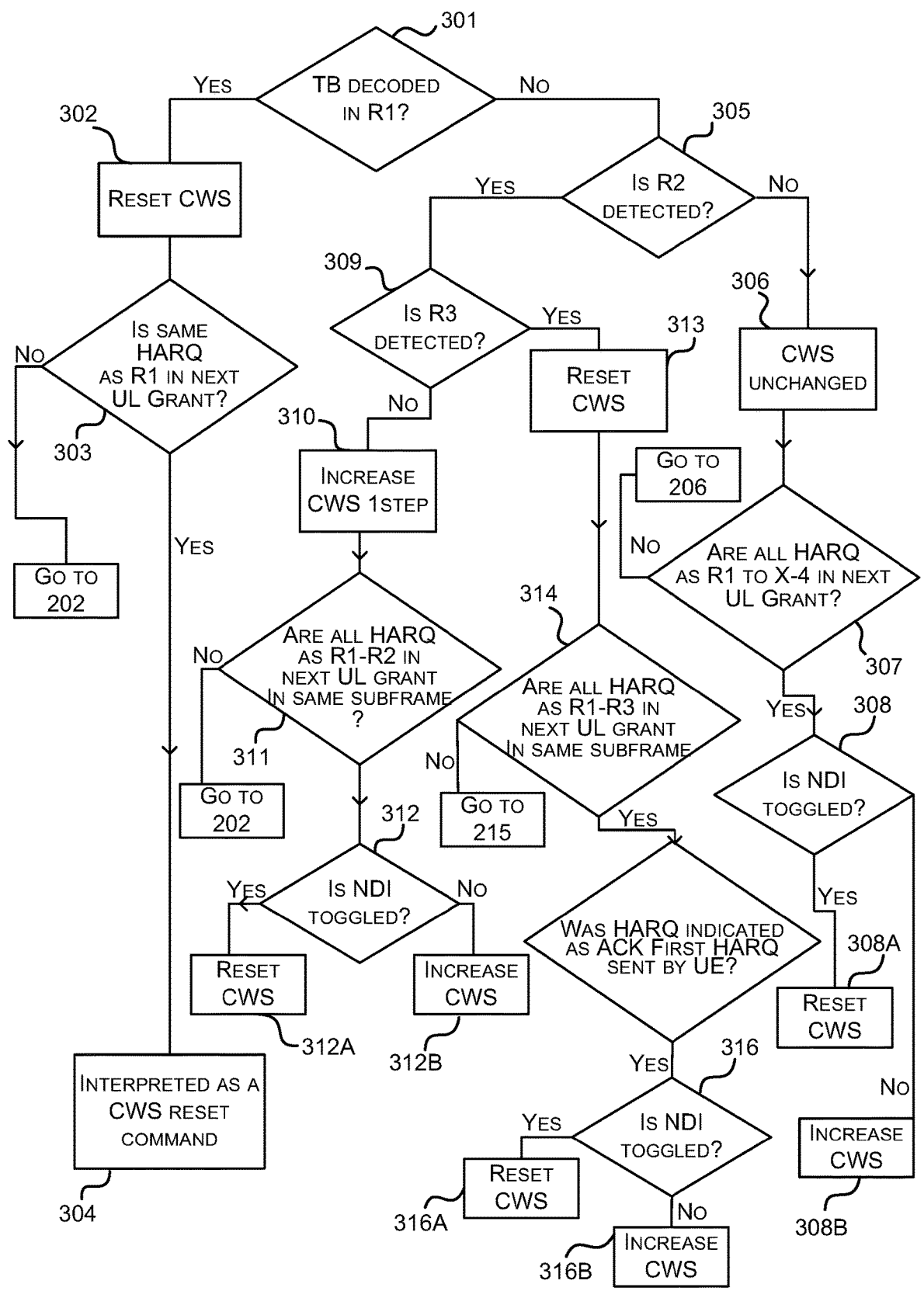
FIG. 3 is a simplified flow chart illustrating a second exemplary method for updating an uplink contention window.

Reference will now be made to FIG. 3, which is a flowchart illustrating a second method for updating a contention window and which may be carried out in the wireless communication system of FIG. 1. This second method exploits the HARQ (Hybrid Automatic Repeat Request) process, and has the advantage that no additional signalling is required from the eNB to the UE. If the eNB thinks that the UE can carry out the contention window adjustment based on the current scheduled HARQ processes, then it may choose not to include the specific signalling described with reference to FIG. 2. If the required HARQ process(es) can be scheduled in the next UL Grant message, the CW adjustment signalling bits can be saved, otherwise the CW adjustment signalling bits need to be included in the next UL Grant message. At the UE side, the UE always marks down the HARQ process ID (P) which is transmitted in the starting subframe of the most resent burst after a Category 4 LBT and the starting subframe should be at least 4 ms earlier than the subframe where the UL Grant message with HARQ process P is received. On receipt of a UL Grant message, the UE first checks if HARQ process P is scheduled or not, if it is scheduled, the UE assumes that there is no CW adjustment signalling. Otherwise, the UE assumes that there are CW adjustment signalling bits.

Three reference subframes R1, R2 and R3 are defined as in the first method described above with reference to FIG. 2.

If at least one transport block is successfully decoded (at the eNB) in the starting subframe (R1=R2), then the eNB schedules the same HARQ process in the next uplink grant message as was scheduled in the starting subframe R1. When an uplink grant message is received from the eNB, the UE checks if HARQ process P is scheduled or not. If it is scheduled, then the UE will believe that no signalling is being sent for a contention window size adjustment and the adjustment will be based on the NDI (New Data Indicator) of HARQ process P.

At 301, the eNB attempts to detect the starting subframe, R1 and to decode at least one transport block (TB) contained therein. If this is done successfully, then at 302, the eNB resets its contention window size. At 303, the eNB may either include the same HARQ process as was scheduled in R1 in the next uplink grant message and send this uplink grant message to the UE or it may include the same signalling as in step 202 of FIG. 2. If HARQ process P is scheduled, then at 304, the UE receives the uplink grant message with the included HARQ and interprets the toggled NDI as a command to reset its uplink contention window size. Thus, the uplink contention window size can be reset at the UE side end without any additional signalling from the eNB.

If no transport block was successfully decoded from R1, then at 305, the eNB attempts to detect another subframe, R2. If no subframe was detected i.e R2 does not exist, then the uplink contention window size at the eNB side remains unchanged, at 306. At 307 the eNB either includes all HARQ processes which were scheduled in subframes from R1 to X-4 (inclusive) in the next uplink grant message in the same subframe or includes the same signalling as given in step 206 of FIG. 2. On receipt of the uplink grant message, the UE adjusts the CW sizes for all priority classes according to the NDI of HARQ process P (308). If NDI is toggled, the CW sizes are reset for all priority classes (308A). If NDI is not toggled then the CW sizes are increased (308B).

Reverting to 305, if R2 is detected but, at 309, R3 is not the same as R2, (i.e no transport blocks are successfully decoded in R2) then at 310 the eNB increases the uplink contention window size at the eNB side by one step and at 311 either includes all HARQ processes which were scheduled in subframes from R1 to R2 (inclusive) or a CW size indicator is sent to the UE (step 212 of FIG. 2) in the next uplink grant message in the same subframe and sends the uplink grant message to the UE At 312, on receipt of the HARQ P process in this uplink grant message, the UE adjusts the CW sizes for all priority classes according to the NDI of HARQ process P. If NDI is toggled, the CW sizes are reset for all priority classes (312A). If NDI is not toggled then the CW sizes are increased (312B).

Reverting to 309 if at least one transport block is successfully decoded in R2 (i.e R3 exists and R2=R3) then at 313 the eNB resets the CWS at the eNB side and at 314 either includes all HARQ processes which were scheduled in subframes from R1 to R3 (inclusive) (R3=R2) or the index of R3 as indicated in 215 of FIG. 2 in the next uplink grant messages in the same subframe and sends this uplink grant message to the UE. If, at 315, the HARQ process indicated as Ack by the NDI is the first HARQ process which was transmitted by the UE, then at 316 on receipt of the HARQ process P in this uplink grant message, the UE adjusts the CW sizes for all priority class according to the NDI of HARQ process P. All CW sizes are reset (316A) if NDI is toggled. All CW sizes are increased (316B) if NDI is not toggled. All CW sizes remain unchanged if HARQ process P is not included in the current UL Grant message.

The signal processing functionality of the embodiments of the invention may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. A wireless communication device including a signal processing circuit for generating a reference scheduled burst comprising:
   a starting subframe followed by a sequence of subsequent subframes, at least one subframe containing at least one transport block, and for adjusting an uplink contention window value based on information received from a base station, and
   a receiver for receiving the information from the base station wherein the wireless communication device is arranged to mark down a reference HARQ process ID which was sent in the starting subframe of a most recent reference scheduled burst after a Listen Before Talk procedure and excluding those HARQ process IDs within a required processing time of the subframe when the next uplink grant message is received from the base station.

2. The wireless communication device of claim 1, wherein the required processing time is 3 ms.

3. The wireless communication device of claim 1, wherein the toggled NDI (New Data Indicator) of a HARQ process ID in the uplink grant message is used to reset the uplink contention window size for all priority classes.

4. The wireless communication device of claim 1, wherein the non toggled NDI (New Data Indicator) of a HARQ process ID in the uplink grant message is used to increase the uplink contention window size for all priority classes to the next higher level.

5. A method for updating an uplink contention window size in a listen before talk process in a wireless communication system, the method comprising:
   at a wireless communication device, transmitting a reference scheduled burst comprising a starting subframe followed by a sequence of subsequent subframes, at least one subframe containing at least one transport block; and at a base station, receiving the reference scheduled burst from the wireless communication device, detecting at least one subframe of the reference scheduled burst, decoding a transport block contained in at least one subframe in the reference scheduled burst, and if a transmission block contained in the starting subframe is successfully decoded, instructing the wireless communication device to reset the uplink contention window size to a predetermined minimum value CWmin otherwise, indicating to the wireless communication device, a first subframe whose at least one transport block contained therein was successfully decoded, and at the wireless communication device, receiving the indication and adjusting the uplink contention value size based on the indication.

6. A base station including a receiver for receiving from a wireless communication device a reference scheduled burst comprising:

a starting subframe followed by a sequence of subsequent subframes, at least one subframe containing at least one transport block, a signal processor for detecting at least one subframe of the reference scheduled burst and decoding a transport block contained in at least one subframe in the reference scheduled burst, and a transmitter for sending an instruction to the wireless communication device to reset an uplink contention window to a predetermined minimum value if a transmission block contained in the starting subframe is successfully decoded, and for indicating to the wireless communication device a first subframe in the reference scheduled burst whose at least one transport block contained therein was successfully decoded if at least one transport block in the starting subframe was not successfully decoded.

7. The base station of claim 6, wherein the transmitter is arranged to send an uplink grant message to the wireless communication device that includes an adjusted uplink contention window size value if a subsequent subframe was detected but no transport block was successfully decoded.

8. The base station of claim 6, wherein the transmitter is arranged to send an uplink grant message to the wireless communication device that includes an indication that no subframes were detected.

9. The base station of claim 6, wherein the instruction to reset the uplink contention window is included in an uplink grant message and comprises a plurality of bits.

10. The base station of claim 6, wherein an indication of said first subframe in the reference scheduled burst whose at least one transport block contained therein was successfully decoded is included in an uplink grant message and comprises a plurality of bits.

11. The base station of claim 7, wherein the adjusted uplink contention window size value comprises a plurality of bits.

12. The base station of claim 8, wherein said indication comprises a plurality of bits.

13. The base station of claim 6, wherein the instruction to reset the uplink contention window is included in an uplink grant message which includes a HARQ process which was scheduled in the starting subframe.

14. The base station of claim 6, wherein the an indication of said first subframe in the reference scheduled burst whose at least one transport block contained therein was successfully decoded is included in an uplink grant message which includes all HARQ processes which were scheduled from the starting subframe to said first subframe in the reference scheduled burst whose at least one transport block contained therein was successfully decoded.

15. The base station of claim 7, wherein the uplink grant message includes all HARQ processes scheduled from the starting subframe to a first detected subframe.

16. The base station of claim 8, wherein the uplink grant message includes all HARQ processes scheduled in an immediately preceding uplink grant message excluding those within 3 ms of the current uplink grant message.

17. A wireless communication device including a signal processing circuit for generating a reference scheduled burst comprising:

a starting subframe followed by a sequence of subsequent subframes, at least one subframe containing at least one transport block, and for adjusting an uplink contention window value based on information received from a base station, and a transmitter for transmitting to the base station the generated reference scheduled burst, and a receiver for receiving the information from the base station, said information indicating a first subframe in the reference scheduled burst other than the starting subframe whose at least one transport block contained therein was successfully decoded at the base station.

18. The wireless communication device of claim 17, wherein the signal processing circuit is arranged to increase the uplink contention window size for all priority classes if the wireless communication device first transmitted in a reference scheduled burst earlier than the subframe indicated to the wireless communication device by the base station.

19. The wireless communication device of claim 17, wherein the signal processing circuit is arranged to reset to CWmin the uplink contention window sizes for all priority classes if the wireless communication device first transmitted in a reference scheduled burst in the subframe indicated to the wireless communication device by the base station.

20. The wireless communication device of claim 17, wherein the wireless communication device is arranged to mark down a reference HARQ process ID which was sent in the starting subframe of a most recent reference scheduled burst after a Category 4 Listen Before Talk procedure and which is at least 4 milliseconds earlier than the subframe when the next uplink grant message is received from the base station.

21. The wireless communication device of claim 20, wherein the receiver receives an uplink grant message from the base station which includes at least one HARQ process and wherein the signal processing circuit is arranged to either reset to a minimum value or increase the value of an uplink contention window size depending on whether an NDI (New Data Indicator) in the received HARQ process is toggled or not.

22. A non-transitory computer readable medium having computer readable instructions stored thereon for execution by a processor to perform the method according to claim 1.

23. The non-transitory computer readable medium of claim 19, comprising at least one from a group consisting of:
a hard disk, a CD-ROM,
an optical storage device,
a magnetic storage device,
a Read Only Memory,
a Programmable Read Only Memory,
an Erasable Programmable Read Only Memory, EPROM,
an Electrically Erasable Programmable Read Only Memory; and
a Flash memory.

* * * * *